(12) United States Patent
Hamichi

(10) Patent No.: US 7,281,665 B2
(45) Date of Patent: Oct. 16, 2007

(54) MONITORING THE USE OF SERVICES IN A TELECOMMUNICATION NETWORK

(76) Inventor: Farid Hamichi, 50 avenue Jean Jaurés, Montrouge (FR) 92120

(*) Notice: Subject to any disclaimer, the term of this patent is extended or adjusted under 35 U.S.C. 154(b) by 63 days.

(21) Appl. No.: 10/535,877

(22) PCT Filed: Nov. 21, 2003

(86) PCT No.: PCT/IB03/05313

§ 371 (c)(1),
(2), (4) Date: May 20, 2005

(87) PCT Pub. No.: WO2004/049219

PCT Pub. Date: Jun. 10, 2004

(65) Prior Publication Data

US 2006/0068846 A1   Mar. 30, 2006

(30) Foreign Application Priority Data

Nov. 22, 2002 (EP) ................... 02292910

(51) Int. Cl.
*G06K 19/06* (2006.01)
(52) U.S. Cl. ................................................. 235/492
(58) Field of Classification Search ............... 235/492
See application file for complete search history.

(56) References Cited

U.S. PATENT DOCUMENTS

| | | | | |
|---|---|---|---|---|
| 6,003,113 A | * | 12/1999 | Hoshino | 711/106 |
| 6,016,963 A | * | 1/2000 | Ezawa et al. | 235/492 |
| 6,644,556 B2 | * | 11/2003 | Adelmann | 235/492 |
| 6,776,332 B2 | * | 8/2004 | Allen et al. | 235/380 |
| 7,024,206 B2 | * | 4/2006 | Hamanaga et al. | 455/456.1 |

(Continued)

FOREIGN PATENT DOCUMENTS

DE   199 48 950 A1   4/2001

(Continued)

OTHER PUBLICATIONS

ANONYMOUS: "Digital Cellular Telecommunications System (Phase 2+) (GSM); Universal Mobile Telecommunications System (UMTS); USIM Application Toolkit (USAT) (3GPP TS 31.111 version 3.3.0 Release 1999)" ETSI TS 131.111 v3.3.0 (Dec. 2000), XP002274751; pp. 70-75.

(Continued)

*Primary Examiner*—Daniel Stcyr
*Assistant Examiner*—Jamara A. Franklin
(74) *Attorney, Agent, or Firm*—Osha Liang LLP

(57) ABSTRACT

A method for monitoring a subscriber's use of a service in a telecommunication network including a communication device configured to communicate through the telecommunication network with a server. The communication device may be coupled to a subscriber's smart card, such that the subscriber's smart card includes services configured to initiate or receive an action from the communication device. Further, the action may include at least one parameter identifying a first service, such that the method may include an interception step, in which a command associated with the first service is intercepted. Subsequently, the method may also include an extraction step, in which relevant data identifying the first service is extracted from the command. Following the extraction step, the method may also include a calculation step, in which the relevant data is analyzed to provide statistical information, which may be related to behavior of the subscriber's use of the first service.

16 Claims, 3 Drawing Sheets

U.S. PATENT DOCUMENTS

Figure 1:
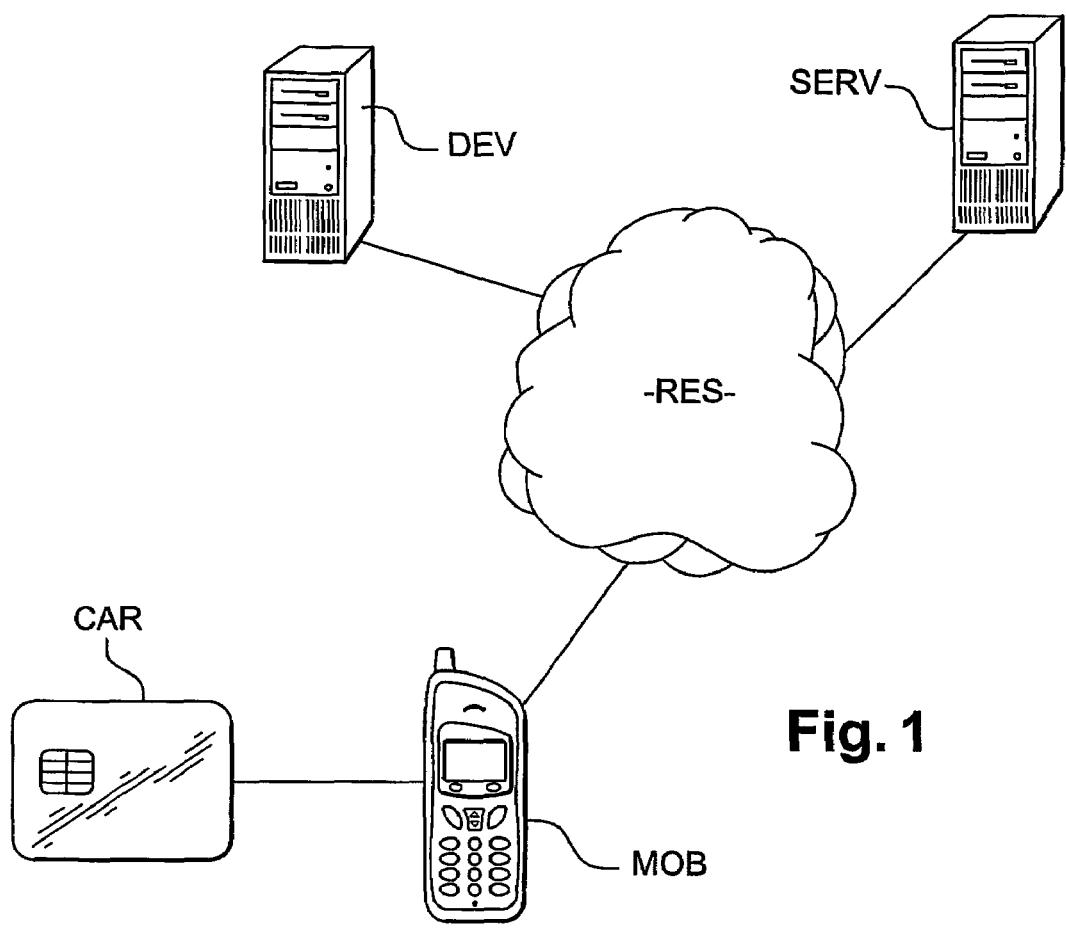

2002/0043565 A1* 4/2002 Hoshino et al. ............ 235/492
2002/0169700 A1  11/2002 Huffman et al.
2006/0027644 A1*  2/2006 Takashi et al. ............ 235/380

FOREIGN PATENT DOCUMENTS

DE       100 04 847 A1    8/2001
EP          1 307 037 A1    5/2003
WO       WO-99 29132 A1    6/1999
WO       WO-02 071727 A2   9/2002

OTHER PUBLICATIONS

International Search Report.

* cited by examiner

MONITORING THE USE OF SERVICES IN A TELECOMMUNICATION NETWORK

TECHNICAL FIELD

This invention relates to a method for performing statistical calculation about the use of services in a communication device coupled to a tamper resistant device such as a SIM (Subscriber Identity Module) card. The invention particularly applies to the use of SIMTOOLKIT (STK) applications stored inside a SIM card. The invention is not limited to SIM cards but can be extended to any emerging or future portable object whose use would be similar to that of the SIM card use.

In the below description, the example which will be used to illustrate the invention will be that of a SIM card coupled to a mobile phone.

PRIOR ART

The telecommunication industry business is very competitive. Telecommunication operators spend a lot of money to know customer expectations. Telecommunication operator strategy depends on many parameters from market segments to customer behaviors. Nevertheless, getting useful and relevant information directly from customer is very complicated.

Targeting a customer or a group of customers to design a set of new services that will generate new revenues is becoming more and more complex. Cost of surveys is becoming prohibitive.

This is very difficult for telecommunication operators:
to get consistent data, about content providers that will use their GSM (Global System for Mobile communication) network,
to know how services are used in a SIM card.

Consequently, this is very difficult for operators to determine which one or which ones, from a global set of customized services, are the services worth to be delivered to the customer.

SUMMARY OF THE INVENTION

One objective is therefore to provide statistical information about the use of services in a mobile phone or in the corresponding SIM card.

To achieve this objective, according to the invention, commands transiting between the mobile phone and the smart cards are intercepted. As a command includes at least one parameter identifying a service, the invention comprises the following steps:
An interception step, in which a command initiating an action is intercepted;
An extraction step, in which relevant data identifying a service is extracted from said command;

We will see in the above description that a command initiating an action can be stored inside the mobile or the card coupled to the mobile phone.

In this way, relevant data which have been extracted can be analyzed in order to deduce statistical information about the use of the corresponding service. This can be done for each subscriber. Thanks to this invention, telecommunication operators will be able to adjust their commercial campaign budget by getting more proper information on customer groups targeted.

It will be easier to understand the invention on reading the description below, given as an example and referring to the attached drawings.

Figure 2:
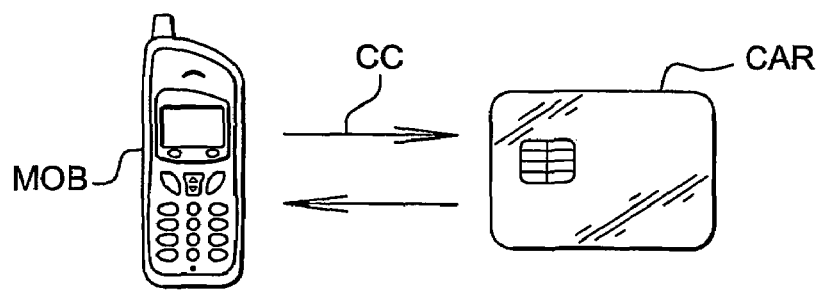
Figure 3:
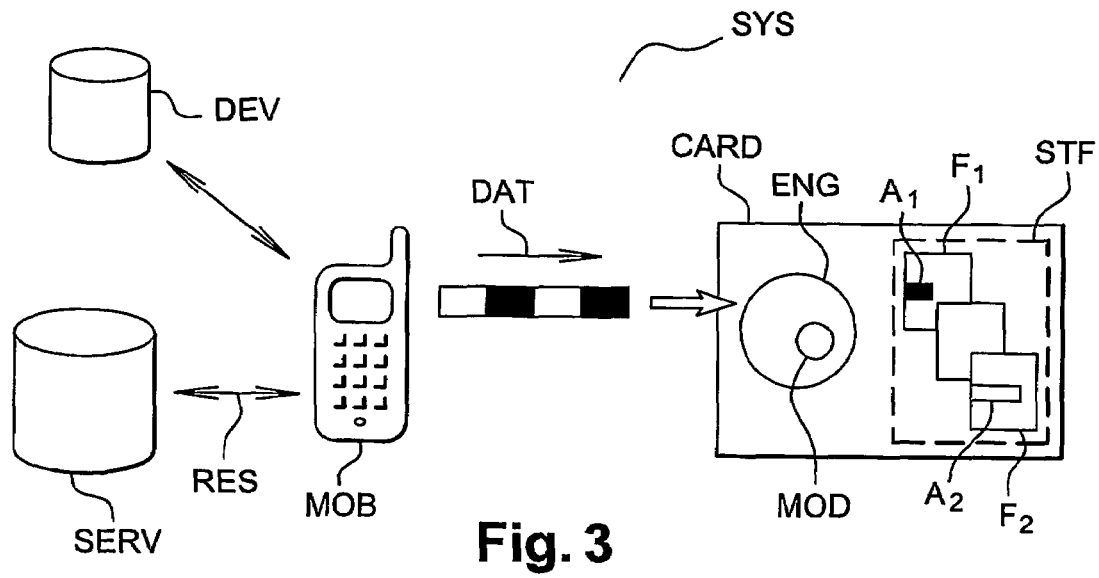
Figure 4:
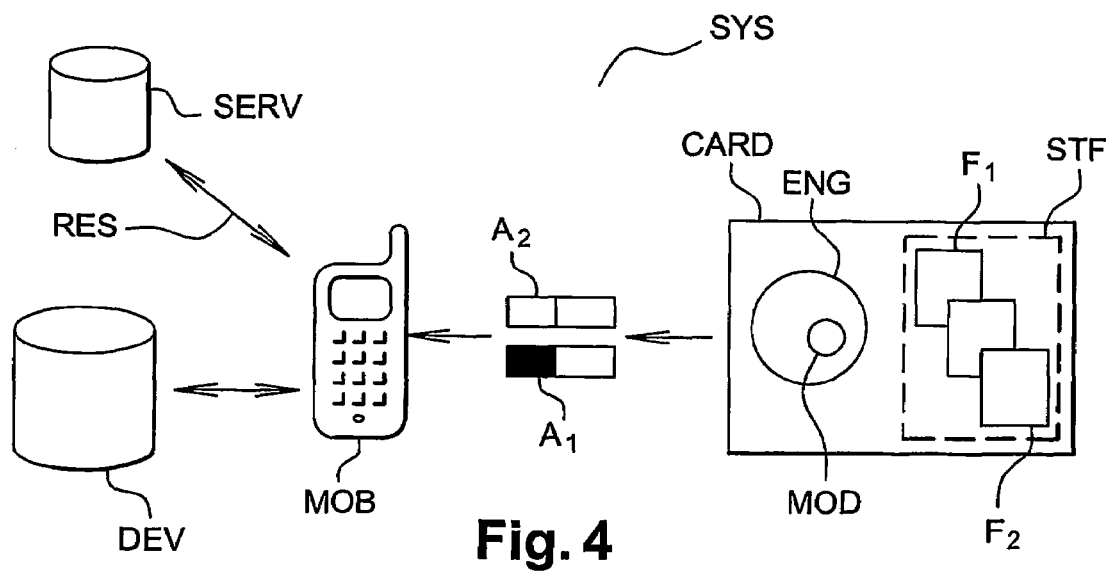
Figure 5:
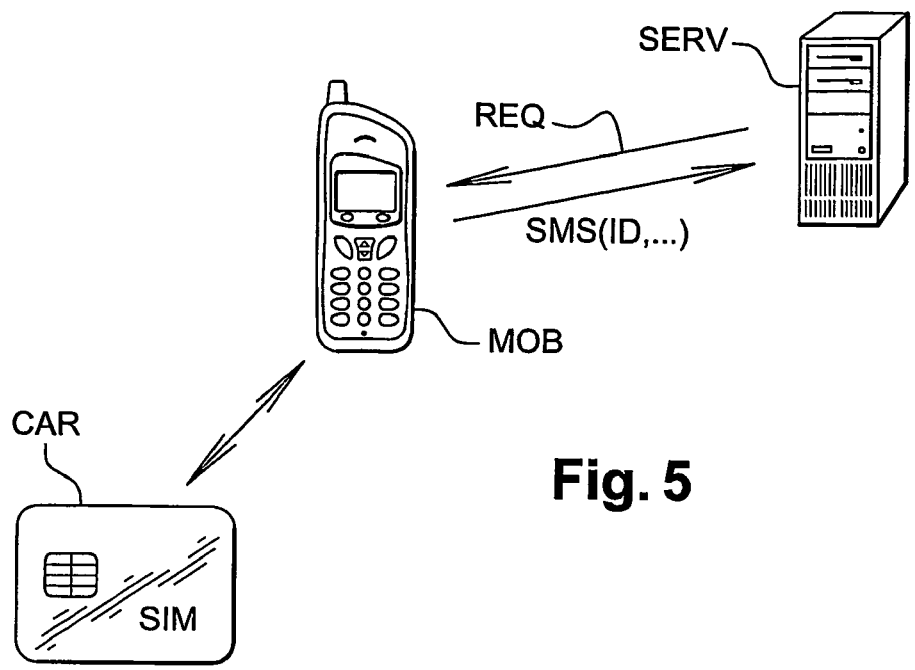
Figure 6:
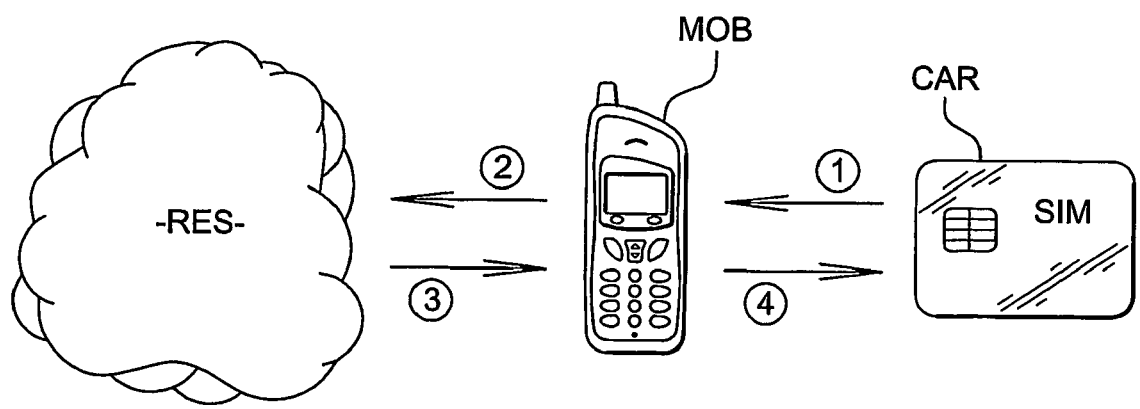

In the drawings:
FIG. 1 is a diagrammatic view of the architecture to which the invention can be applied;
FIGS. 2-4 are examples illustrating a first embodiment of the invention;
FIG. 5 is a view of a communication between the mobile phone and a server.
FIG. 6 is a view of another example illustrating the invention.

DETAILED DESCRIPTION OF EXAMPLES ILLUSTRATING THE INVENTION

To simplify the description, the same elements illustrated in the drawings have the same references.

FIG. 1 shows a system SYS to which this invention can be applied. This system SYS includes a SIM card CAR, a mobile phone MOB, a GSM Network RES. In our example, this system also comprises a destination device DEV (which can either be a Content Provider offering services through the GSM Network, another mobile phone, a fixed line . . . ), a platform server SERV collecting data collected by the card CAR. A telecommunication operator can for example manage this platform.

FIG. 2 illustrates the exchange of information between the card CAR and the mobile phone MOB. According to this embodiment, we consider that the Card CAR can subscribe to control commands offered by the mobile phone. So, each time the user wants to perform an action with the mobile phone MOB (acceding to a 3G service, calling, sending an SMS, . . . ), the mobile phone will provide data regarding the action performed to the card CAR through command controls CC. These commands CC are standardized commands. We will refer to ETSI standards 11.14 & 31.111 for more information about these commands.

Preferably, in order to have more security, the application engine ENG is stored inside the card CAR. In this way, this is sure that statistical information generated by the engine ENG is attached to one subscriber. The application engine ENG within the card CAR will not interfere with other applications stored in the card or stored in the mobile phone MOB; it will not modify behavior of other these applications; the engine ENG only acts as listening program. The engine ENG only extracts and collects relevant data.

So, according to this embodiment:
The application engine ENG within the card CAR will preferably always authorize the action performed by the user; preferably, all actions are intercepted;
In the same manner, the engine ENG will intercept the data or part of the data coming from the mobile phone MOB into the card CAR.

On FIG. 3, we have represented a command which is a data stream DAT coming from the mobile phone MOB. In this example, the command is coming from the mobile. Inversely, the command could come from the card CAR.

In our example, said data stream DAR includes two relevant data A1 and A2. After reception of the received data, the engine ENG extracts relevant data A1 and A2 and stores them in a file included in a set of files STF. In our example, the first result A1 is stored in the file F1 and the result A2 is stored in a file F2.

Referring to FIG. 4, relevant data A1 and A2 are transmitted from the card to the mobile phone MOB. Then, a message from the mobile phone MOB is transmitted to the statistical server SERV. This message can be a SMS message or other equivalent message such as MMS.

Then, the server SERV receives data A1 and A2. In our example, as the received data are already analyzed inside the card CAR and in a pre-formatted format, the server SERV will be able either to exploit directly the received data A1 and A2. For example, this exploitation enables the operator to deduce behavior of users or of group of users.

Preferably, extracted data are not stored in memory as such. Advantageously, the engine ENG will do an analysis and a data formatting afterwards. The engine ENG analyzes the content of extracted data and performs statistical calculation including possibly previous collected data An. As the analyzed data have a lower size than the received data, the analysis particularly allows the engine to reduce data storage within the card CAR.

In our example, the engine ENG send extracted data to the server without any analysis; in this example, the analysis is performed in the server SERV.

Advantageously, the statistical server SERV will communicate with a SMS module MOD within the engine ENG to trigger the sending of such message SMS from the card CAR. With reference to FIG. 5, the server sends a message REQ requesting that the card sends extracted data An which have been collected. In our example, transmission of data A1 and A2 is performed on request of the server SERV. In another embodiment, the card can perform the sending of data A1 and A2 periodically; for this, a program could be activated in the card at predetermined time.

In our example, the card CAR stores address of the statistical server SERV. So that, the application engine ENG will be able to send SMS messages including the identifier ID of the server SERV.

With this system, it will be easy to get all the information about content used by each subscriber.

FIG. 6 is a second example illustrating the invention. In this second example, we consider that the card CAR cannot subscribe to control commands CC offered by the mobile phone as in our first example. The engine will have to focus on other functionalities and commands done by the mobile phone. According to this example, the engine ENG will listen to each proactive command generated by the SIM card. The commands that allow users to connect themselves to network services (via calls, SMS, Channel Data . . . ) will be monitored and relevant data will be extracted and stored. If these commands are successfully performed, then statistical analysis will be done to package data in a way they can be retrieved by the server SERV. In this case, sending information from the SIM to the statistical server use exactly the same process as described in the first embodiment.

Different steps 1-4 are represented on FIG. 6:

Step 1: The SIM card performs a call by way of a standardized command "SET UP CALL".

Step 2: in a second, the call is performed by the mobile phone MOB.

Step 3: in a third step, the call is successfully performed.

Step 4: in a fourth step a command is sent from the mobile phone MOB to the card CAR for indicating that the call has been successfully performed.

In all these steps, the program ENG listens all proactive commands generated inside the smart card.

We see now that, apart from the main advantage, the invention also includes other advantages.

We have seen that the smart card (CAR) comprises program for sending said extracted data to a server (SERV). This allows for example to update the server regularly.

We have seen that the analyzing step includes a processing step for converting statistical information in a pre-formatted format. The card (CAR) comprises a program for performing statistical calculation from said extracted data. In this way, the statistical server SERV receives information in a good format avoiding or easing further calculation.

We have also seen that for performing the interception step, the program listens all proactive commands generated inside the smart card. In this way, the operator is sure that collected information will provide statistical information about the use of services inside the card CAR. In the same manner, the engine ENG can also intercept all commands coming from the device.

We have also seen that the storage of extracted information is in a pre-formatted format and in that this pre-formatting consists in using mathematical functions, for example average function, or an addition, etc. This allows the card CAR to reduce consumption of memory.

We have also seen that, once the statistical information is sent to the interested entity, the memory space allocated to this statistical information is freed. In this way, the freed space can be allocated to other data. This function is very interesting in a SIM card where memory space is very limited.

We have also seen that the invention concerns a program ENG including code instructions for the execution of the following steps:

An interception step, in which a command initiating an action is intercepted;

An extraction step, in which relevant data identifying a service is extracted from said command;

When said program is executed on said smart card or in said mobile.

The invention claimed is:

1. A smart card configured to communicate with a communication device, said smart card comprising:
   a plurality of services configured to initiate or receive an action from said communication device, said action comprising at least one parameter identifying a first service,
   wherein said smart card comprises a microcontroller programmed for performing the following steps:
      an interception step, wherein a command associated with the first service is intercepted, the command being sent from the communication device to the smart card;
      an extraction step, wherein relevant data identifying the first service is extracted from said command; and
      a calculation step, wherein the relevant data is analyzed to provide statistical information, the statistical information comprising information relating to behavior of a subscriber's use of the first service.

2. The smart card according to claim 1,
   wherein said microcontroller is programmed for sending said extracted relevant data to a server.

3. A method for monitoring a subscriber's use of a service in a telecommunication network comprising:
   a communication device configured to communicate through the telecommunication network with a server, said communication device being coupled to said subscriber's smart card,
   said subscriber's smart card including services configured to initiate or receive an action from said communication device, said action including at least one parameter identifying a first service, wherein the method comprises the following steps:
an interception step, wherein a command associated with the first service is intercepted, the command being sent from the communication device to the smart card;
an extraction step, wherein relevant data identifying the first service is extracted from said command; and
a calculation step, wherein the relevant data is analyzed to provide statistical information, the statistical information comprising information relating to behavior of said subscriber's use of the first service.

4. The method according to claim 3, wherein the interception step comprises a program configured to listen to all proactive commands generated inside the smart card.

5. The method according to claim 3, wherein the interception step comprises a program configured to listen to all commands coming from the communication device.

6. The method according to claim 3, wherein memory space allocated to said extracted relevant data is freed once the extracted relevant data is sent to the server.

7. The method according to claim 3, wherein the calculation step is carried out inside the smart card.

8. The method according to claim 3 further comprising:
a transmitting step;
wherein the transmitting step transmits the extracted relevant data to a remote server; and
wherein the calculation step is carried out in the remote server.

9. The method according to claim 8, wherein said computer program is executed on said smart card.

10. The method according to claim 3, wherein the computer program is stored in said smart card.

11. The method according to claim 10, wherein said computer program is executed on said smart card.

12. The method according to claim 3, wherein the computer program is stored in said communication device.

13. A computer program configured to communicate with a smart card, said smart card comprising:
a plurality of services configured to initiate or receive an action from a communication device, said action including at least one parameter identifying a first service,
wherein said program includes code instructions for the execution of the following steps:
an interception step, wherein a command associated with the first service is intercepted, the command being sent from the communication device to the smart card;
an extraction step, wherein relevant data identifying the first service is extracted from said command; and
a calculation step, wherein the relevant data is analyzed to provide statistical information, the statistical information comprising information relating to behavior of a subscriber's use of the first service.

14. A smart card configured to communicate with a communication device, said smart card comprising:
a plurality of services configured to initiate or receive an action from said communication device, said action comprising at least one parameter identifying a first service;
wherein said smart card comprises a microcontroller programmed for performing the following steps:
an interception step, wherein a command associated with the first service is intercepted, the command being sent from the smart card to the communication device;
an extraction step, wherein relevant data identifying the first service is extracted from said command; and
a calculation step, wherein the relevant data is analyzed to provide statistical information, the statistical information comprising information relating to behavior of a subscriber's use of the first service.

15. A method for monitoring a subscriber's use of a service in a telecommunication network comprising:
a communication device configured to communicate through the telecommunication network with a server, said communication device being coupled to said subscriber's smart card;
said subscriber's smart card including services configured to initiate or receive an action from said communication device, said action including at least one parameter identifying a first service,
wherein the method comprises the following steps:
an interception step, wherein a command associated with the first service is intercepted, the command being sent from the smart card to the communication device;
an extraction step, wherein relevant data identifying the first service is extracted from said command; and
a calculation step, wherein the relevant data is analyzed to provide statistical information, the statistical information comprising information relating to behavior of said subscriber's use of the first service.

16. A computer program configured to communicate with a smart card, said smart card comprising:
a plurality of services configured to initiate or receive an action from a communication device, said action including at least one parameter identifying a first service,
wherein said program includes code instructions for the execution of the following steps:
an interception step, wherein a command associated with the first service is intercepted, the command being sent from the smart card to the communication device;
an extraction step, wherein relevant data identifying the first service is extracted from said command; and
a calculation step, wherein the relevant data is analyzed to provide statistical information, the statistical information comprising information relating to behavior of a subscriber's use of the first service.

* * * * *